J. H. MOLTHAN.
LANTERN BAIL.
APPLICATION FILED JAN. 11, 1919.

1,333,764.

Patented Mar. 16, 1920.

INVENTOR
J. H. MOLTHAN,
BY
Milton S. Crandall,
ATTORNEY

UNITED STATES PATENT OFFICE.

JOHN H. MOLTHAN, OF CLEAR LAKE TOWNSHIP, DEUEL COUNTY, SOUTH DAKOTA.

LANTERN-BAIL.

1,333,764.  Specification of Letters Patent.  Patented Mar. 16, 1920.

Application filed January 11, 1919. Serial No. 270,722.

*To all whom it may concern:*

Be it known that I, JOHN H. MOLTHAN, a citizen of the United States, and a resident of Clear Lake township, in the county of Deuel and State of South Dakota, have invented certain new and useful Improvements in Lantern-Bails, of which the following is a specification.

The invention aims, primarily, to provide a lantern-bail adapted to be readily applied to a lantern and so constructed as to permit relative oscillation between the bail and lantern, and yet remain in an upwardly extending position to be conveniently grasped when the lantern is resting on its base.

A further object of the invention is the production of an improved lantern-bail inexpensive and simple in construction, yet thoroughly efficient in operation.

With these and other objects in view, the invention, consisting in the construction, combination and novel arrangement of parts, will be fully understood from the following description, reference being had to the accompanying drawings, which form a part of this application, and in which like characters of reference indicate corresponding parts throughout the several views, of which,—

Figure 1:
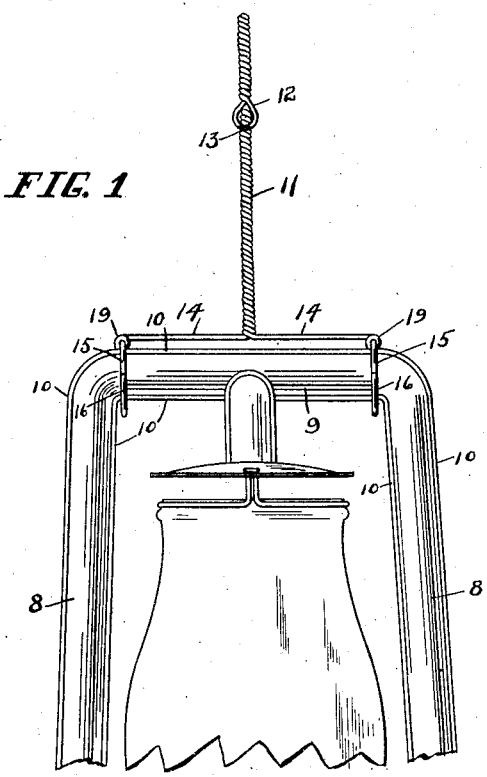
Figure 1 is a fragmentary front elevation of a familiar form of lantern with an appropriate embodiment of my invention applied thereto.

While I have illustrated and hereinafter described three embodiments suitable for practising the invention, I would not be understood as being limited to the specific structures chosen for illustration, for various alterations and modifications may be made in the details of construction and arrangement of parts, without departing from the spirit and scope of the invention as defined in the appended claims.

The carrying-hook illustrated herein is divided from the present application, and forms, in part, the subject-matter of my copending application No. 270,721, filed January 11, 1919; and it will be evident that such specific carrying member is not essential to the present invention.

Referring, now, particularly to Figs. 1 to 4, the lantern illustrated includes tubular upright frame members, 8, formed integrally with an upper cross member, 9. The said frame members are, in transverse section round, or slightly oval-shaped, and are provided with longitudinal ribs, 10, on their opposite sides.

The bail is constructed, preferably, of a single piece of wire, folded at its center and twisted upon itself for a distance, the twisted portion being curved to form a carrying-hook, 11. The terminal of the hook extends downwardly and is formed with an eye, 12, adapted to receive a nail or pin to support the lantern, and the lower edge of the eye is beveled to form a sharp edge, 13, adapted to engage a flat surface to support the lantern and prevent displacement of the hook therefrom.

The untwisting portions of the wire are bent laterally to the hook, forming oppositely-disposed arms, 14, the free end portions of the arms being formed with depending loops adapted to encompass the cross frame member of the lantern, and so shaped and constructed as to permit relative oscillation between the lantern and bail and yet retain the bail in an upwardly-extended position when the lantern is sitting upon its base. In the embodiment designed for use with the type of lantern described above, the said loops are diamond-shaped in general contour, and are formed by bending the free end portions of the arm, 14, laterally to the said arms and diagonally downwardly, as at 15, then diagonally downwardly in the direction of the vertical plane of the arms, as at 16, then diagonally upwardly, forming sides 17, approximately in parallelism with the sides, 15, then diagonally in the direction of the arms, forming sides, 18, substantially parallel with the sides, 16. The loops are placed around the frame member, 9, and the extreme end portions of the loops are then bent around the loop members, 15, adjacent the arms, as at 19.

The loops are mutually so spaced as to be positioned adjacent the upright frame members, respectively; and are of sufficient size to freely encompass the frame member, 9, and permit relative oscillation between the bail and lantern. When the lantern is resting on its base, the bail may remain upright, the loop sides, 15 and 18, resting on the sides of the frame member, 9, and the upper rib, 10, engaging in the angles formed by said sides, as shown in Fig. 3; or the bail may be tilted, either forwardly or rearwardly, and held in an inclined position against gravitation by engagement of the ribs, 10, with an upper and a lower side of each loop, as presented in Fig. 4.

Figure 3:
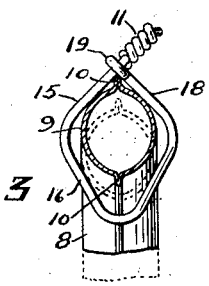
Figs. 3 and 4 are enlarged transverse sections of the lantern frame with the encompassing loops of the bail shown in different positions.

When the lantern is lifted by means of the loop of the hook, the loops and frame assume the relative positions indicated in dotted lines in Fig. 3.

Figure 2:
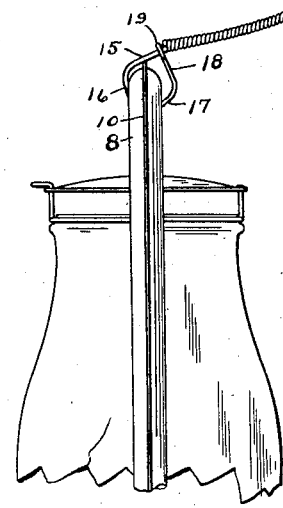
Fig. 2 is a side elevation of the same, the bail being tilted.
Figure 4:
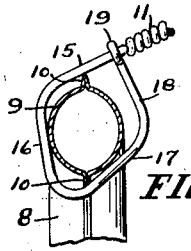

When the lantern is supported by the end of the hook, as in Fig. 2, the loops and frame assume, approximately, the relative positions shown in Fig. 4.

Figure 5:
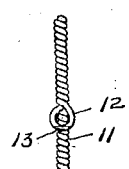
Fig. 5 is a fragmentary front elevation of a different type of lantern, with a modified embodiment of the invention applied thereto.

The lantern shown in Fig. 5 is of the same general type as that presented in Figs. 1 and 2, but the upright and horizontal frame members, 20 and 21, respectively, are flat-sided, or rectangular in cross section. For this style two modifications of the loops are suggested, that shown in Fig. 5, and amplified in Fig. 6, being formed by bending the free end portions of the arms a distance laterally to the arms, as at 22, then downwardly, as at 23, at a slight angle from the vertical plane of the arms, then bent laterally, intersecting the vertical plane of the arms, as at 24, the said portions, 24, being curved downwardly. The remaining end portions of the arms are then bent upwardly and outwardly at a slight angle to and in the direction of the vertical plane of the arms, as at 25, and then bent laterally toward the portion 22, and the extreme end portions are then bent around the arms, as at 27. Thus, the portions, 22 and 26, form horizontal upper sides of the loops, the portions 23 and 25 the upright sides of the loops, and the portions 24, the bottoms of the loops. Obviously, the loops are placed around the frame member prior to closing the loops at 27.

Figure 6:
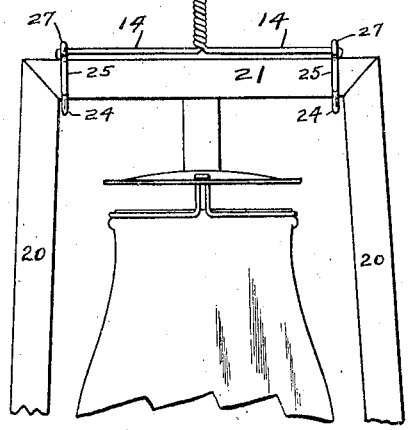
Fig. 6 is an enlarged transverse section of the lantern frame presented in Fig. 5, and one of the loops of the bail.
Figure 6:
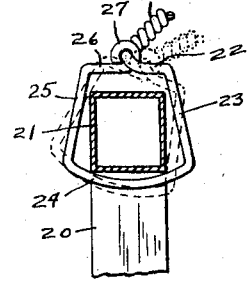

When the lantern is supported by the hook, 11, the frame member 21, rests on the center portions of the bottom members of the loops, as shown in Fig. 6; and when the lantern rests on its base, the upper portions, 22—26, of the loops may rest on the member, 21. When the lantern is supported by the end 12, of the hook, the loops assume the position indicated in dotted lines in Fig. 6, and the said loops will also be thus disposed if the hook is tilted when the lantern rests on its base.

Figure 7:
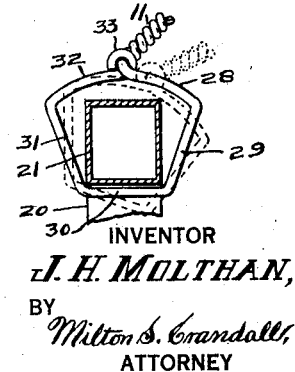
Fig. 7 is a similar view, the connecting loops being slightly modified.

In the modification shown in Fig. 7, the loops are similar to those shown in Fig. 6, but are inverted, with respect thereto, as their greater breadth is at the top. They are formed by bending the end portions of the arms, 14, laterally and curving them downwardly, as at 28, then bending them downwardly toward the vertical plane of the arms, as at 29, then laterally to intersect said plane, as at 30, then upwardly and from the said plane, as at 31, and bending them laterally and curving them upwardly, as at 32, toward the arms, and, finally, after the loops are placed around the frame member, 21, the extreme end portions are bent around the arms, as at 33.

Having thus described my invention, what I claim as new and desire to secure by Letters Patent of the United States, is:

1. A bail for a lantern having a horizontal frame member with external projections, comprising a carrying member and loops thereon adapted to encompass the frame member and so shaped and constructed as to permit relative oscillation between the bail and frame member, and engageable with said projections to limit such oscillation and retain the bail in an upwardly-extended position when the lantern rests on its base.

2. A bail for a lantern having a horizontal frame member with external projections, comprising a carrying member, oppositely-disposed arms thereon, and loops on the arms adapted to encompass the frame member and so shaped and constructed as to permit relative oscillation between the bail and frame member and engageable with said projections to limit such oscillation and retain the bail in an upwardly-extended position when the lantern rests on its base.

3. A bail for a lantern having a horizontal ribbed frame member, comprising a carrying member and loops thereon adapted to encompass the frame member, and so shaped and constructed as to permit relative oscillation between the bail and lantern, and engage the ribs of the frame member to limit such oscillation and retain the bail in an upwardly-extended position when the lantern rests on its base.

4. A bail for a lantern having a horizontal ribbed frame member, comprising a carrying member having horizontal oppositely-disposed arms, and loops on the arms adapted to encompass the frame member, and so shaped and constructed as to permit relative oscillation between the bail and lantern, and engage the ribs of the frame member to limit such oscillation and retain the bail in an upwardly-extended position when the lantern rests on its base.

5. A bail for a lantern having a horizontal ribbed frame member, comprising a carrying member, and diamond-shaped loops thereon adapted to encompass the frame member, to support the latter and permit relative oscillation between the bail and lantern, the sides of the loops being engageable with the ribs of the frame member to limit such oscillation and retain the bail in an upwardly-extended position when the lantern rests on its base.

In testimony whereof I have hereunto set my hand this 23rd day of November, 1918.

JOHN H. MOLTHAN.